Figure 1:
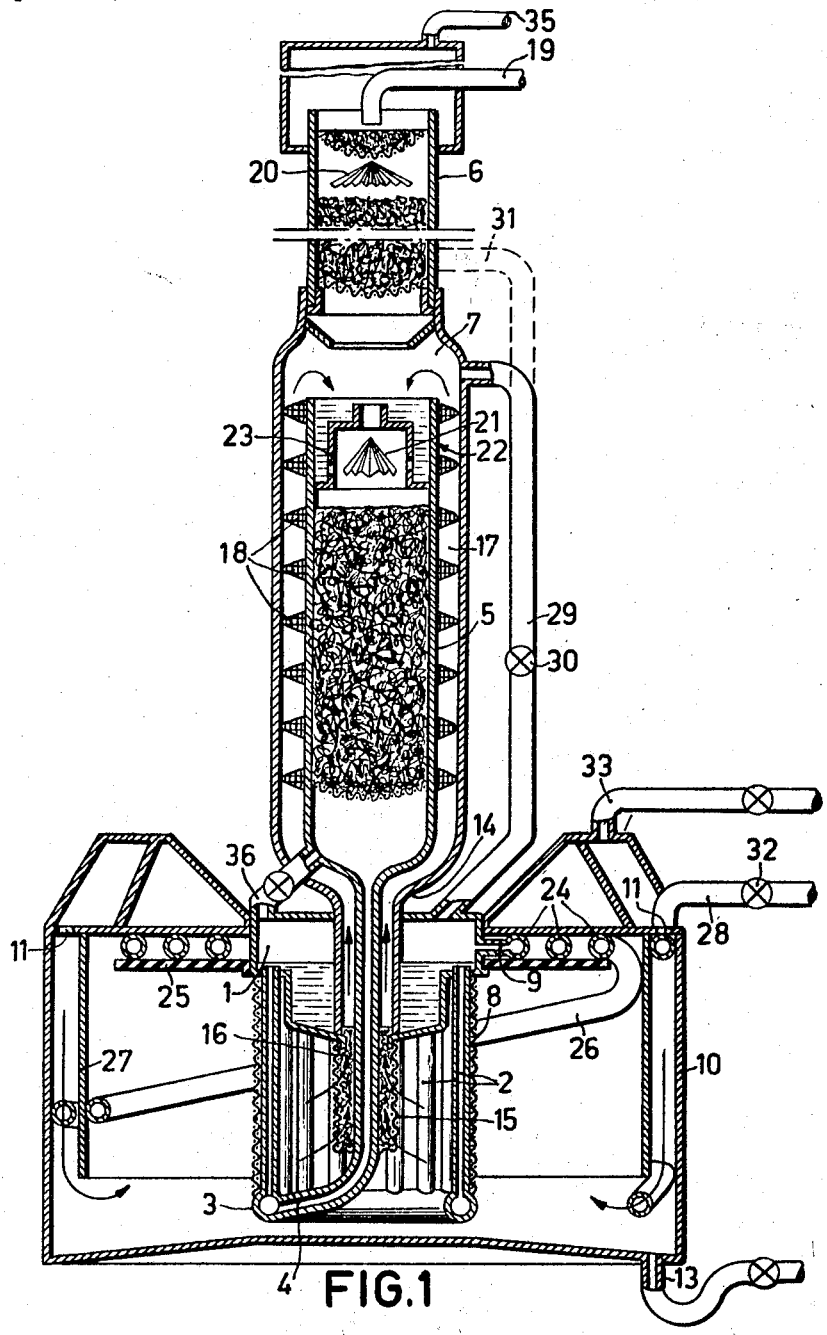

June 6, 1967

J. VAN DER STER 3,323,317

GAS-FRACTIONATING SYSTEM

Filed April 23, 1964

2 Sheets-Sheet 2

INVENTOR.
JOHANNES VAN DER STER
BY
AGENT

United States Patent Office 3,323,317
Patented June 6, 1967

3,323,317
GAS-FRACTIONATING SYSTEM
Johannes van der Ster, Emmasingel, Eindhoven, Netherlands, assignor to North American Philips Company, Inc., New York, N.Y., a corporation of Delaware
Filed Apr. 23, 1964, Ser. No. 362,157
Claims priority, application Netherlands, Apr. 25, 1963, 291,994
2 Claims. (Cl. 62—42)

The invention relates to a gas-fractionating system comprising a column the lower end of which is connected to a boiling vessel in which liquid is evaporated, the system comprising a duct through which gas to be fractionated is supplied to the column.

In known systems of the said kind, no vapour is discharged from the boiling vessel during the cooling period. In connection with the present invention, the term "cooling period" is used to denote the time required, in starting the system, to cool the system from room temperature to its operational temperature. The upper end of such a column is provided with an inlet pipe for liquid top product and with an outlet pipe for liquid evaporated in the boiling vessel. The inlet pipe for liquid and the outlet pipe for the vapour may be a single pipe the other end of which is connected to a condensation space surrounding the cold head of a cold-gas refrigerator. The vapour then flows through this pipe to the condensation space where it condenses, the condensate being returned back to the column through the same pipe. The condensate flows downwards along the packing or trays of the column and is collected in the boiling vessel.

It has been found that the vapour flow produced in the column during the cooling period is different from that produced during normal operation. The refrigerator has a capacity of M litres of condensed gas per hour. During operation, $x$ litres of liquid top product is delivered, so that only $M-x$ litres of condensate arrives in the boiling vessel and evaporates there. A quantity of the vapour produced in the boiling vessel corresponding to $y$ litres of condensate per hour is discharged. Consequently, a vapour flow corresponding to $M-(x+y)$ litres of condensate rises through the lower column portion. At the area at which the inlet duct for the gas mixture to be fractionated opens into the column, a gas stream corresponding with $(X+Y)$ litres of condensate is added to the rising gas stream, so that per hour a gas stream rises through the upper column portion which corresponds to M litres of condensate. During the cooling period, the refrigerator again condenses M litres per hour. Since no top product is discharged during this period, the whole quantity of condensate reaches the boiling vessel. Especially at the beginning of the cooling period this boiling vessel is still hot, so that the condensate rapidly evaporates. Since moreover no bottom product is discharged, the whole quantity of produced vapour must flow back through the column to the condensation space. This implies that per hour a gas stream corresponding to M litres of condensate rises both through the upper portion and through the lower portion of the column. In some cases, this stream may exceed by a factor 3 the current $$M-(x+y)$$

which rises per hour through the lower column portion in normal operation. This means that the speed at which the gas rises in the lower column portion is considerably greater during the cooling period than in normal operation. This involves the risk of the liquid flowing down being driven up by the rising vapour. The liquid can then be pushed upwards so violently that the liquid cannot enter the lower column portion and is driven into the inlet duct for the gas to be fractionated. This would interfere with satisfactory cooling of the system.

In order to overcome this disadvantage, the gas-fractionating system constructed in accordance with the invention is characterized in that a duct is connected to the boiling vessel the other end of which is in communication with a portion of the column situated at or above the orifice of the duct through which the gas mixture to be fractionated is supplied to the column. This duct comprising a valve which may be opened during the cooling period of the system, so that the portion of the column located between the boiling vessel and the orifice of the inlet duct for the gas in the column is short-circuited.

In this manner, by structurally simple means the gas speeds in the portion of the column located between the boiling vessel and the area at which the inlet duct for the gas mixture to be fractionated opens into the column are prevented from becoming excessively high. The risk of the liquid being driven upwards and consequently entering the inlet duct is thus completely eliminated.

Although it is possible for a separate short-circuit pipe to be provided in the system, according to a further embodiment of the system in accordance with the invention, in which a pipe for conducting away gaseous bottom product during operation is connected to the boiling vessel, this pipe may be connected during the cooling period of the system through one or more change-over valves to the duct through which the gas to be fractionated is supplied to the system.

The invention will now be described more fully with reference to the accompanying drawings, which show schematically two gas-fractionating columns according to the invention.

Figure 2:
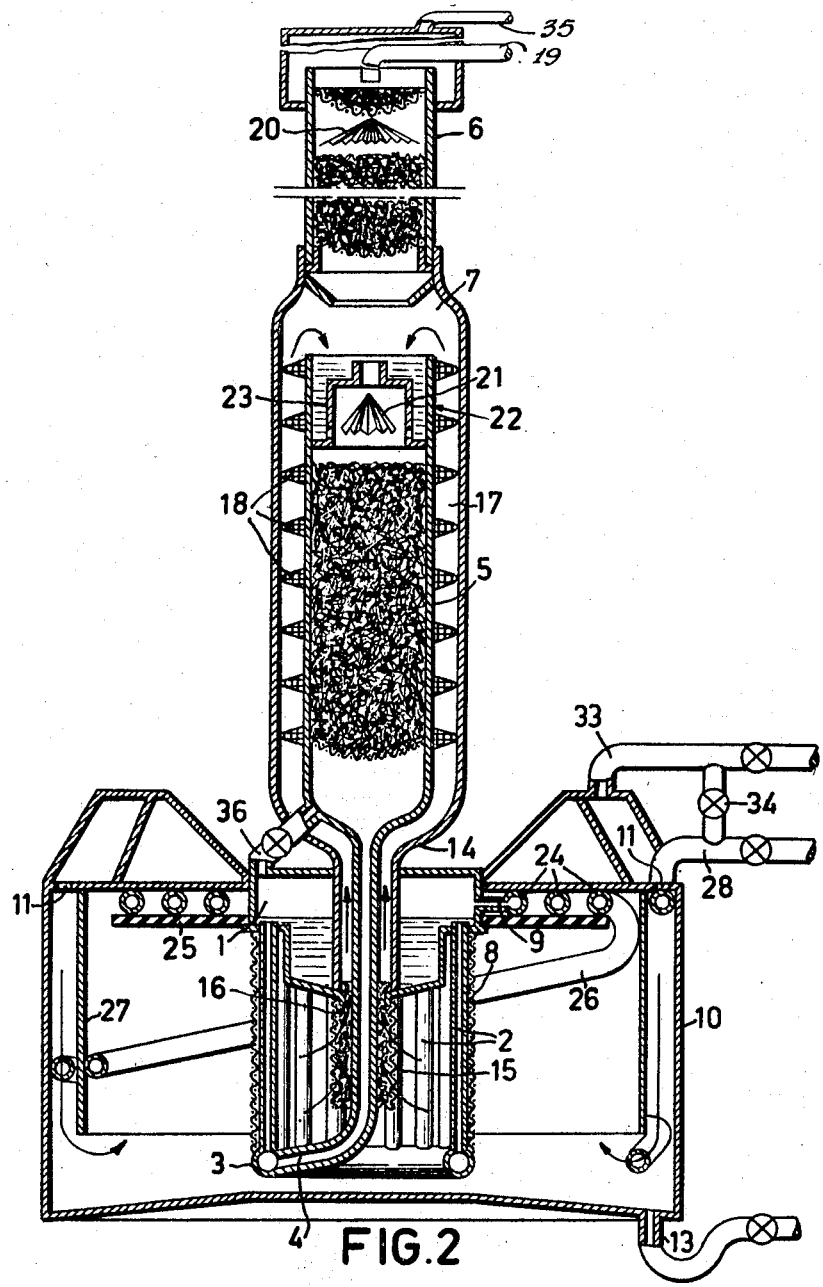

FIGS. 1 and 2 are sectional views of two gas-fractionating columns, the gas-fractionating column shown in FIG. 1 being provided with a separate short-circuit pipe and the gas-fractionating column shown in FIG. 2 comprising a valve through which the outlet duct for the gaseous bottom product and the inlet duct for the gas mixture to be fractionated may communicate with each other.

Referring now to FIGS. 1 and 2, reference numeral 1 denotes a vessel. This vessel supports a cage or framework of pipes 2 the lower ends of which open into an annular duct 3 into which a tube 4 also open which conducts liquid gas from a $x$ fractionating column to the duct 3, the pipes 2 and the vessel 1.

The column comprises a portion 5 and a portion 6, between which the inlet duct for the gas to be fractionated opens at 7. The portions 5 and 6 are filled with a packing.

A cylinder of metal gauze 8 surrounds the cage of pipes 2. The gauze is in thermal contact with the pipes and is strongly cooled by the liquid flowing through the pipes 2.

An outlet duct 9 for the gaseous bottom product is connected to the vessel 1. This duct 9 comprises a portion 24 which extends spirally between the upper side of a housing 10 surrounding the vessel 1 and an insulating plate 25. The spiral portion 24 is prolonged by a portion 26 which follows a tortuous path both along the inner side and along the outer side of a shield 27. At 28, this duct leaves the system.

The housing 10 is provided with a plurality of apertures 11 through which the gas to be fractionated can enter the system. Water separated from the gas to be fractionated is collected on the bottom of the housing 10 and conducted away through a duct 13. The water which does not arrive at the bottom of the housing 10 is collected in a layer of snow formed on the metal gauze 8.

A tube 14 surrounds the tube 4 and the column portion 5. The tube 14 passes through the vessel 1 and its lower end is secured to an apertured pot 15 in which filter material 16 is provided. An annular duct 17 is provided between the tube 14 and the column portion 5. In the annular duct 17, provision is made of gauze collars 18 which are in thermal contact with the outer wall of the column portion 5.

Condensate is introduced into the column through a pipe 19 and distributed in the column over the packing by liquid distributors 20 and 21.

A portion 22 of the wall of column portion 5 surrounding the distributor 21 is provided on the inner side with an annular liquid container 23 in which washing liquid flowing out of column portion 6 is collected and brought into thermal contact with the wall portion 22.

The system shown in FIG. 1 further comprises a short-circuit pipe 29 which is provided with a valve 30, one end of this pipe being connected to the vessel 1 while the other end opens into the column portion 6 at 7 or at an arbitrary area 31.

When the system is started, it must first be cooled from room temperature to its ultimate operational temperature. This is effected by supplying the whole quantity of condensate through the pipe 19 to the column. This condensate flows down through the column and finally arrives in the vessel 1, where it evaporates rapidly as a result of the high temperature. At the beginning of the cooling period, the outlet duct 9, 26, 28 is closed by means of the valve 32, while the inlet duct 33 for the gas mixture to be fractionated is also closed. Consequently, the whole quantity of vapour produced in the vessel 1 rises through a duct 36 in the column where it is conducted away through a duct 35 to a condensation device (not shown). The rising vapour stream which, as has been stated hereinbefore exceeds the vapour stream in operation, pushes up the liquid gas flowing down over the packing, which involves the risk of the liquid finding its way into the annular duct 17. This would interfere with satisfactory cooling of the system. In order to eliminate this risk, according to the invention the valve 30 in the duct 29 is opened during the cooling period, so that part of the gas produced in the vessel 1 can flow through duct 29 to the upper portion 6 of the column. Consequently, a smaller quantity rises through the column portion 5, so that the liquid flowing down is prevented from being strongly pushed upwards.

The same effect is obtained in that, as shown in FIG. 2, the outlet duct 28 for the bottom product and the inlet duct 33 for the gas to be fractionated are connected to each other by opening a valve 34. Consequently, the vapour produced in the vessel 1 can reach the upper portion 6 of the column through duct 26, 9, 28, valve 34, duct 33 and the annular duct 17. Consequently, in this system also part of the cold vapour is supplied during the cooling period from the vessel 1 to the upper portion 6 of the column, by passing the lower portion 5. This arrangement has the advantage that the vapour following this bypass already cools the ducts 9, 26, 28 and 33, so that, when the system is switched to normal operation, these ducts already have the correct operational temperature.

After the cooling period, the valve 30 in the duct 29 of FIG. 1 and the valve 34 of FIG. 2, respectively, are closed and the valves in the outlet duct 28 and in the inlet duct 33 are opened. The gas to be fractionated is then introduced into the housing 10 through apertures 11. The water is partly separated out by condensation and is collected on the bottom of the housing 10. Subsequently, on its way to the column, the gas meets the strongly cooled gauze 8 on which a snow cake is formed consisting of crystals of water and carbon dioxide. Remarkably, this cake remains pervious to the gas for a long time. After the gas has been strongly cooled in the snow cake formed on the gauze 8 and the pipes 2, it flows upwards through the filter 15, 16 into the annular space 17 between the tube 4 and the outer wall of the column portion 5. In the annular space 17 provision is made of the gauze collars 18 which are in thermal contact with the outer wall of the column portion 5 and consequently are strongly cooled. The gas then enters the column at 7 where the rectification takes place.

In the system in accordance with the invention, surprisingly simple means thus prevent liquefied gas from finding its way into the inlet duct for the gas mixture to be fractionated during the cooling period.

What is claimed is:

1. A gas fractionating apparatus comprising a column having a boiling vessel for collecting liquified gas, a first duct through which gas to be fractionated is supplied to said column, a second duct connected at one end to said boiling vessel and at the other end to said column at a level above said first duct where the latter communicates with said column, a valve in said second duct which is adapted to be opened during the cooling period of said apparatus whereby the portion of said column located between said boiling vessel and the orifice of said first duct is short circuited, a pipe connected from the bottom of said column to said boiling vessel and conducting away the bottom product from said column to said boiling vessel, and an inlet conduit for said gas to be fractionated surrounding said pipe and for conducting said gas to be fractionated to said first duct, said first duct surrounding said column and provided with gauze collars.

2. The apparatus of claim 1 wherein the apparatus is provided with an inlet and an outlet and the second duct consists of an interconnecting conduit between said inlet and said outlet and the said valve is positioned in the interconnecting conduit.

References Cited

UNITED STATES PATENTS

| 2,048,076 | 7/1936 | Linde | 62—29 X |
|---|---|---|---|
| 2,499,043 | 2/1950 | Voorhees | 62—13 |
| 2,519,892 | 8/1950 | Dennis. | |
| 2,521,400 | 9/1950 | Ogorzaly | 62—29 X |
| 2,526,996 | 10/1950 | Crawford | 62—13 X |
| 2,617,275 | 11/1952 | Goff et al. | 62—14 |
| 2,788,646 | 4/1957 | Rice | 62—14 X |
| 2,867,985 | 1/1959 | Van Der Ster | 62—40 |
| 2,897,656 | 8/1959 | Van Der Ster | 62—40 |

NORMAN YUDKOFF, *Primary Examiner.*

V. W. PRETKA, *Assistant Examiner.*